United States Patent
Swanson et al.

(10) Patent No.: US 8,601,227 B2
(45) Date of Patent: *Dec. 3, 2013

(54) METHODS AND APPARATUS FOR DEMAND-BASED MEMORY MIRRORING

(75) Inventors: Robert C. Swanson, Olympia, WA (US); John V. Lovelace, Irmo, SC (US); Larry D. Aaron, Jr., Irmo, SC (US); Sugumar Govindarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/049,094

(22) Filed: Mar. 16, 2011

(65) Prior Publication Data

US 2011/0173385 A1   Jul. 14, 2011

Related U.S. Application Data

(63) Continuation of application No. 11/966,313, filed on Dec. 28, 2007, now Pat. No. 7,949,850.

(51) Int. Cl.
*G06F 12/16* (2006.01)
*G06F 9/455* (2006.01)

(52) U.S. Cl.
USPC ............. 711/162; 711/173; 714/6.1; 718/1

(58) Field of Classification Search
USPC .......... 711/161–162, 170–173, 114; 713/1, 2, 713/100; 714/6.22–6.23; 718/1, 100
See application file for complete search history.

(56) References Cited

U.S. PATENT DOCUMENTS

| | | | |
|---|---|---|---|
| 4,044,333 A | 8/1977 | Auspurg et al. | |
| 5,488,716 A | 1/1996 | Schneider et al. | |
| 6,000,023 A * | 12/1999 | Jeon | 711/173 |
| 6,006,307 A * | 12/1999 | Cherukuri | 711/114 |
| 6,175,904 B1 * | 1/2001 | Gunderson | 711/162 |
| 6,591,352 B2 | 7/2003 | Lambino et al. | |
| 6,701,421 B1 * | 3/2004 | Elnozahy et al. | 711/170 |
| 6,820,182 B1 * | 11/2004 | Bauman et al. | 711/170 |
| 6,848,039 B1 | 1/2005 | Aaron et al. | |
| 7,036,007 B2 | 4/2006 | Schelling et al. | |
| 7,062,628 B2 * | 6/2006 | Amano | 711/170 |
| 7,107,405 B2 | 9/2006 | Lovelace | |
| 7,213,152 B1 | 5/2007 | Gafken et al. | |

(Continued)

OTHER PUBLICATIONS

Tyson, Jeff, and Dave Coustan. "How RAM Works" Aug. 25, 2000. HowStuffWorks.com. <http://www.howstuffworks.com/ram.htm> Retrieved Jul. 25, 2013.*

(Continued)

*Primary Examiner* — Christian P Chace
*Assistant Examiner* — Nicholas Simonetti
(74) *Attorney, Agent, or Firm* — Trop, Pruner & Hu, P.C.

(57) ABSTRACT

A method includes determining an amount of memory space in a memory device available for memory mirroring. The method further includes presenting the available memory space to an operating system. The method further includes selecting at least a portion of the amount of memory space to be used for memory mirroring with the operating system. The method further includes adding a non-selected portion of the available memory to memory space available to the operating system during operation. An associated system and machine readable medium are also disclosed.

26 Claims, 5 Drawing Sheets

(56) References Cited

U.S. PATENT DOCUMENTS

| | | | |
|---|---|---|---|
| 7,302,526 B1* | 11/2007 | Cartmell et al. | 711/120 |
| 7,305,668 B2 | 12/2007 | Kennedy et al. | |
| 2002/0169987 A1* | 11/2002 | Meushaw et al. | 713/201 |
| 2002/0178352 A1 | 11/2002 | Lambino et al. | |
| 2005/0138465 A1* | 6/2005 | Depew et al. | 714/5 |
| 2005/0210180 A1 | 9/2005 | Rothman et al. | |
| 2006/0184740 A1* | 8/2006 | Ishikawa et al. | 711/129 |
| 2006/0206661 A1* | 9/2006 | Gaither | 711/114 |
| 2008/0005551 A1 | 1/2008 | Swanson et al. | |
| 2008/0271054 A1* | 10/2008 | Allison et al. | 719/319 |
| 2009/0064274 A1 | 3/2009 | Zimmer et al. | |

OTHER PUBLICATIONS

Aiken et al. "Microsoft Computer Dictionary". Microsoft Press 2002. Chapter 14: 'M', p. 423. <http://academic.safaribooksonline.com/book/communications/0735614954/m/ch14> Retrieved Jul. 25, 2013.*

Rothman, Michael A., et al., U.S. Appl. No. 11/771,994, filed Jun. 29, 2007, entitled "Method and Apparatus for Improved Memory Reliability, Availability and Serviceability".

* cited by examiner

METHODS AND APPARATUS FOR DEMAND-BASED MEMORY MIRRORING

This application is a continuation of U.S. patent application Ser. No. 11/966,313, filed Dec. 28, 2007, now U.S. Pat. No. 7,949,850 the content of which is hereby incorporated by reference.

BACKGROUND

Computing devices may include memory devices having memory space designated for storing copies of data already being stored in the memory device. Allowing the memory space to be used for redundant purposes allows data to be recovered if the primary storage space for the data in the memory device experiences a memory error.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
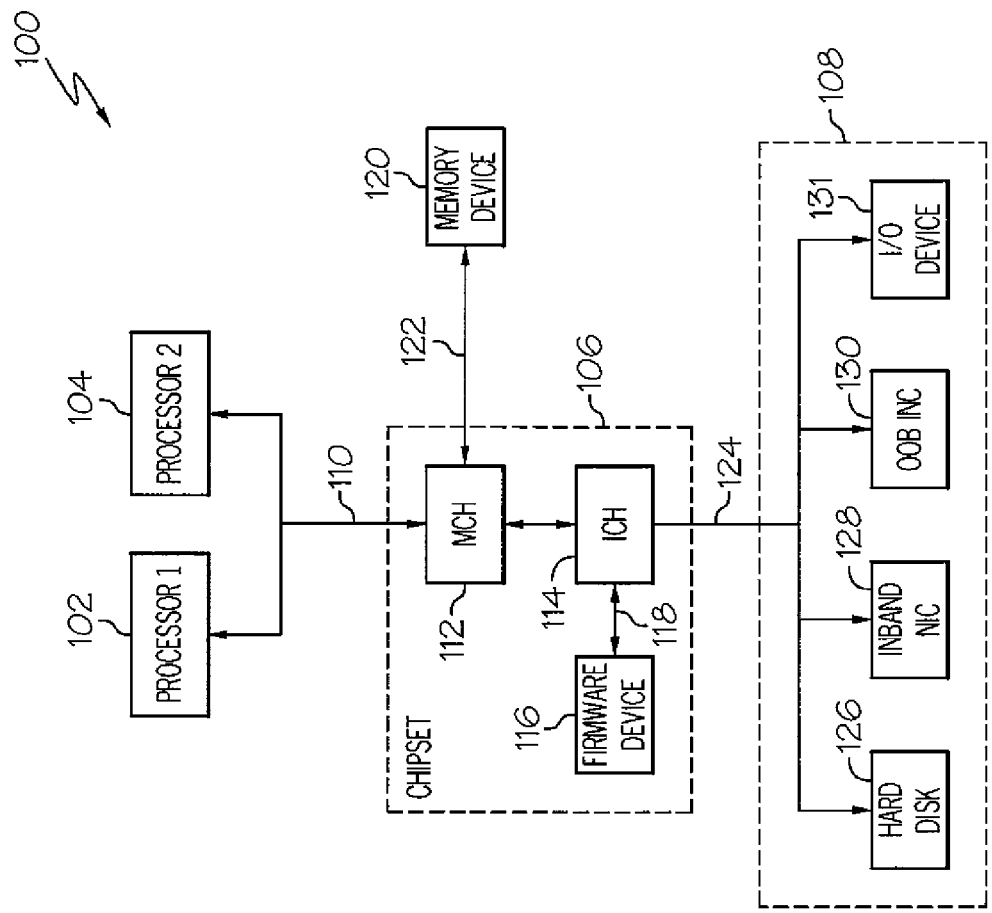
FIG. 1 shows a block diagram of an embodiment of a computing device and associated components.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a computing device 100 includes a plurality of processors 102, 104, a chipset 106, and a plurality of peripheral devices 108. The computing device 100 may be embodied as any type of computing device such as, for example, a desktop computer system, a laptop computer system, a server or enterprise computer system, or a handheld computing device. The processors 102, 104 may include, but are not limited to, processors manufactured or marketed by Intel Corp., IBM Corp., and Sun Microsystems Inc. Each of the processors 102, 104 may also include one or more processing cores.

Each of the processors 102, 104 are communicatively coupled to the chipset 106 via a number of signal paths 110. Signal paths 110 may be embodied as any type of signal paths capable of facilitating communication between the processors 102, 104 and the chipset 106. For example, the signal paths 110 may be embodied as any number of wires, printed circuit board traces, via, bus, intervening devices, and/or the like. The chipset 106 includes a memory controller hub (MCH) or northbridge 112, an input/output controller hub (ICH) or southbridge 114, and a firmware device 116. The firmware device 116 is communicatively coupled to the input/output controller hub 114 via a number of signal paths 118. Similar to the signal paths 110, the signal paths 118 may be embodied as any type of signal paths capable of facilitating communication between the input/output controller hub 114 and the firmware device 116 such as, for example, any number of wires, printed circuit board traces, via, bus, intervening devices, and/or the like. The firmware device 116 is illustratively embodied as a memory storage device for storing Basic Input/Output System (BIOS) data/programs and/or instructions and/or other information.

The MCH 112 is communicatively coupled to a memory device 120 via a number of signal paths 122. Again, similar to the signal paths 110, 118 described above, the signal paths 122 may be embodied as any type of signal paths capable of facilitating communication between the MCH 112 and the memory device 120 such as, for example, any number of wires, printed circuit board traces, via, bus, intervening devices, and/or the like. The memory device 120 may be embodied as dynamic random access memory devices (DRAM), synchronous dynamic random access memory devices (SDRAM), double-data rate dynamic random access memory device (DDR SDRAM), and/or other volatile memory devices. Additionally, although a single memory device is illustrated in FIG. 1, in other embodiments, the computing device 100 may include additional memory devices.

The chipset 110 is also communicatively coupled to a number of peripherals 108 via a number of signal paths 124.

Again, similar to the signal paths 118, 122, the signal paths 124 may be embodied as any type of signal paths capable of facilitating communication between the chipset 106 and the peripherals 108 such as, for example, any number of wires, printed circuit board traces, via, bus, intervening devices, and/or the like. The peripherals 108 may include any number of peripheral devices including data storage devices, interfaces, and output devices. For example, as illustrated in FIG. 1, the peripheral devices 108 may include a hard disk 126, an inband network interface card (NIC) 128, an out-of-band network interface card 130, and I/O device 131, which may include a keyboard, a mouse, a display, a printer, a scanner, or the like. Additionally, in other embodiments, the computing device 100 may include additional or other peripheral devices depending upon, for example, the intended use of the computing device 100. The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. Further, it should be appreciated that the computing device 100 may include other components, sub-components, and devices not illustrated in FIG. 1 for clarity of the description. For example, it should be appreciated that the MCH 112 may include a video controller for controlling a video display or interface and that the ICH 114 may include an interrupt controller for generating interrupt events.

In one embodiment, the memory device 120 may be used for "memory mirroring," which allows data to be stored in the memory device 120, as well as a copy of the stored data. Thus, if an error occurs with the stored data, the copy may be used so that no data is lost. However, in typical systems implementing "memory mirroring," the memory is bifurcated such that half is used for storing data and the second half is automatically used for mirroring the first half.

Figure 2:
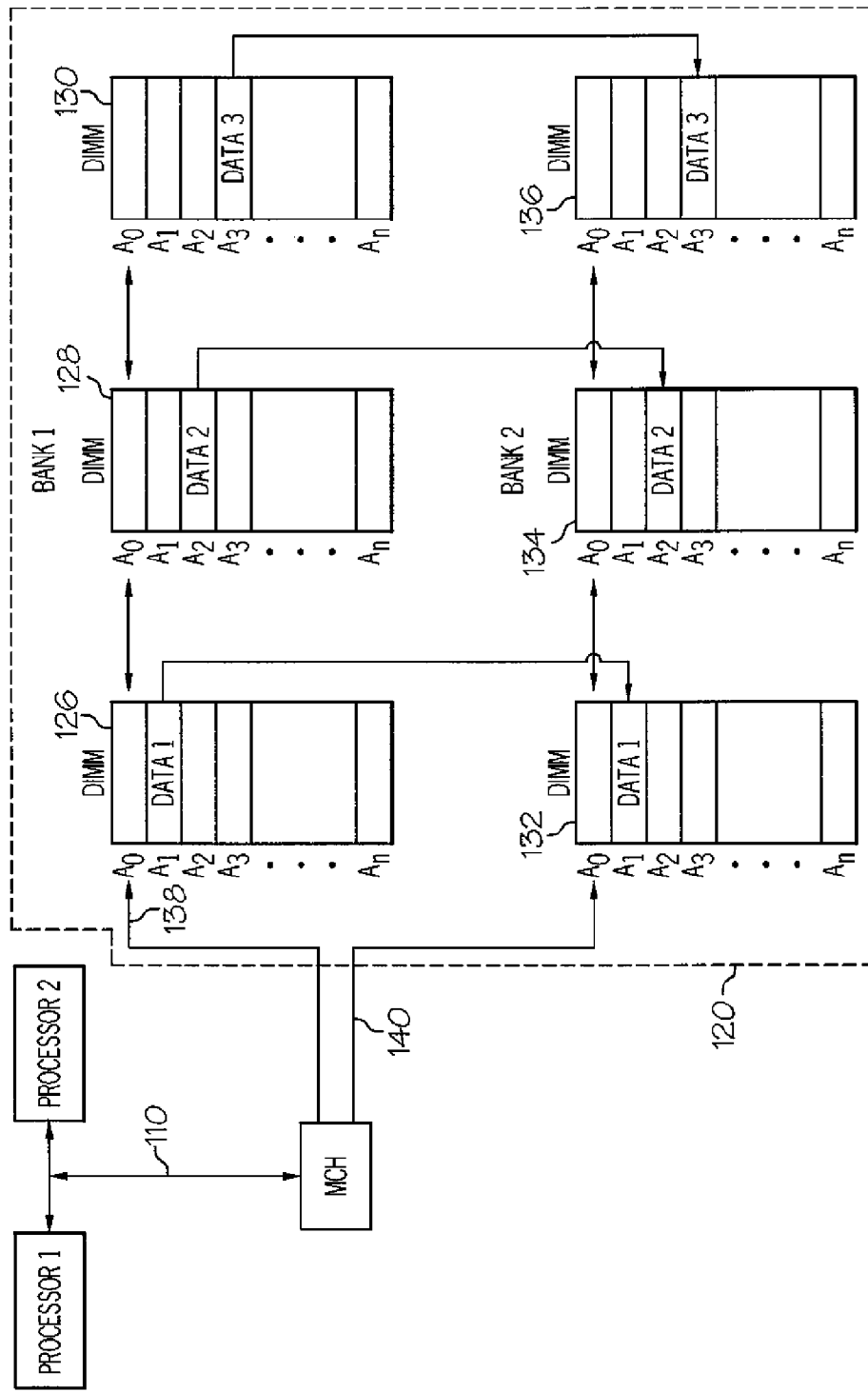
FIG. 2 shows a block diagram of a memory controller and a memory device.

Referring now to FIG. 2, a block diagram shows memory device 120 configured to selectively mirror only portions of a data stored in the memory device 120. In other words, memory mirroring may be used such that only a portion of data stored in the memory device 120 may be copied and stored in the memory device 120. In one embodiment, the memory device 120 may include a plurality of memory banks, designated as bank 1 and bank 2 in FIG. 2. Each memory bank may include a plurality of dual in-line memory modules (DIMMs) 126, 128, 130, 132, 134, 136. Bank 1 includes DIMMs 126, 128, 130 and bank 2 includes DIMMs 132, 134, 136. As illustrated in FIG. 2, each DIMM is connected to the MCH 112, with the DIMMs of bank 1 connected to the MCH 112 via branch 138 and the DIMMs of bank 2 connected to the MCH 112 via branch 140. In one embodiment, the branches 138, 140 may be extensions of the signal paths 122 as shown in FIG. 1.

During operation, the MCH 112 controls the flow of data to and from the DIMMs for data storage and retrieval. When memory mirroring is implemented, bank 2 may be used to mirror, e.g., copy and store, data stored in bank 1. When selective memory mirroring is implemented, selected portions of data stored in the DIMMs of bank 1 may be copied and stored in the DIMMs of bank 2. In one embodiment, data stored at a particular address (designated as $A_0$-$A_n$ in FIG. 2 for each DIMM) in the DIMMs of bank 1 is stored in a corresponding address in the DIMMs of bank 2. As illustrated in FIG. 2, data stored at address A.sub.1, "DATA 1," of the DIMM 126 of bank 1 is stored at address $A_1$ of the DIMM 132 of bank 2. Similarly illustrated in FIG. 2, data stored at address $A_2$, "DATA 2," of DIMM 128 of bank 1 is stored at address $A_2$ of the DIMM 134 of bank 2 and data stored at address $A_3$, "DATA 3," of the DIMM 130 of bank 1 is stored at address $A_3$ of the DIMM 136 of bank 2. Thus, allowing selected portions of memory space in bank 1 may be mirrored in bank 2 allowing memory not used for memory mirroring to be available for other use. In one embodiment, the corresponding addresses may be used for memory mirroring due to interleaving considerations between the each corresponding set of DIMMs of each memory bank.

The configuration of FIG. 2 may allow corresponding memory addresses to be used in the manner described allowing each branch 138, 140 to serve as a channel such that a read operation of mirrored data may be done using bank 1 or bank 2 allowing various considerations, such as memory traffic or performance, for example, to be addressed. In one embodiment, the memory banks 1 and 2 may include other memory module configurations such as single in-line memory modules (SIMMs).

Figure 3A:
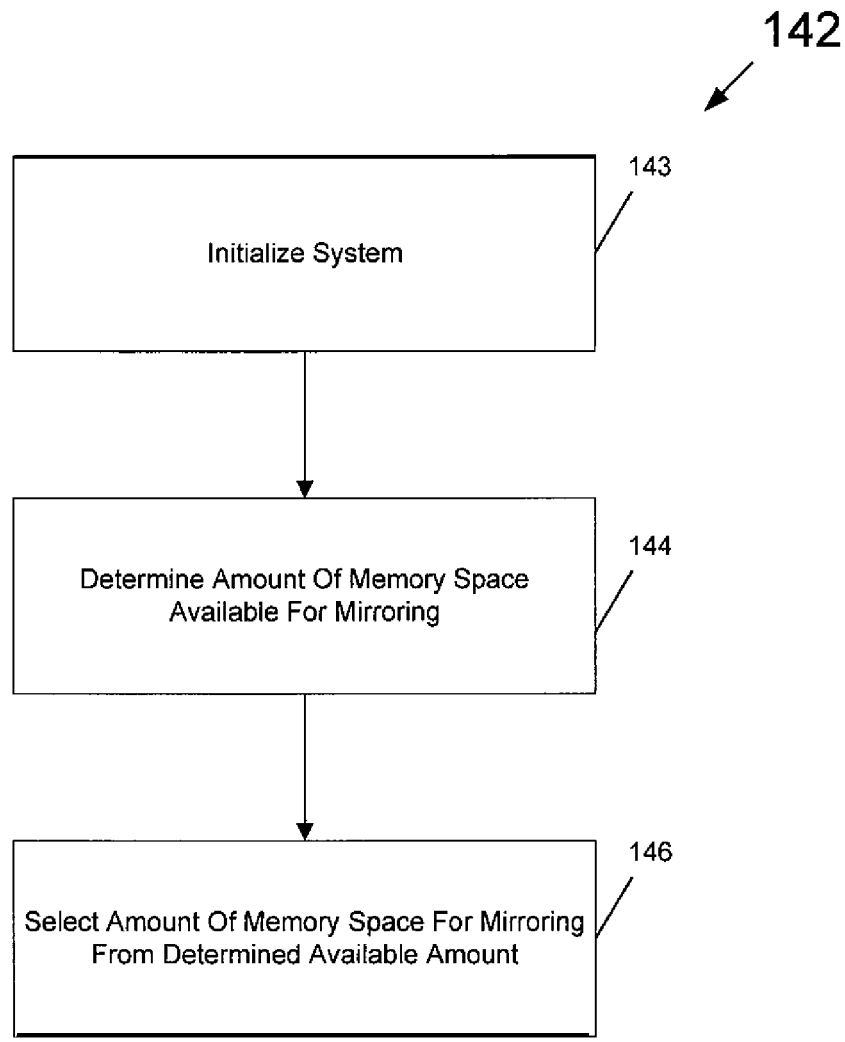
FIGS. 3A and 3B show flowcharts of embodiments of routines for memory mirroring.

FIG. 3A illustrates a flowchart 142 illustrating an embodiment of a routine that may be used to select particular memory space in a memory device to be used for memory mirroring. At block 143, a system is initialized, which may be, for example, the computing device 100 in FIG. 1. At block 144, a determination of an amount of memory space available for memory mirroring is made. In one embodiment, this may be done by the BIOS programs during system initialization or thereafter. An operating system (OS) executed by a system, such as the computing device 100, may also make this determination. Embodiments of an operating system include Microsoft Windows™, the Apple Macintosh operating system, the Linux operating system, the Unix operating system, or the like.

At block 146, an amount of memory space is selected for memory mirroring from the amount of memory space determined to be available at block 144. In one embodiment, the selection of memory to be used for memory mirroring may be selected based upon powers of two allowing the MCH 112 to control the memory space selected accordingly. The selection of memory space to be used for memory mirroring may also be performed in various manners. For example, during an initial boot of a system, a system user may enter a setup mode of the system, such as I/O Device 131 of the computing device to provide a system user the ability to input the amount of memory to be used for memory mirroring. The input of the system user may be processed for control of the MCH 112 in order to control the appropriate memory for mirroring.

Figure 3B:
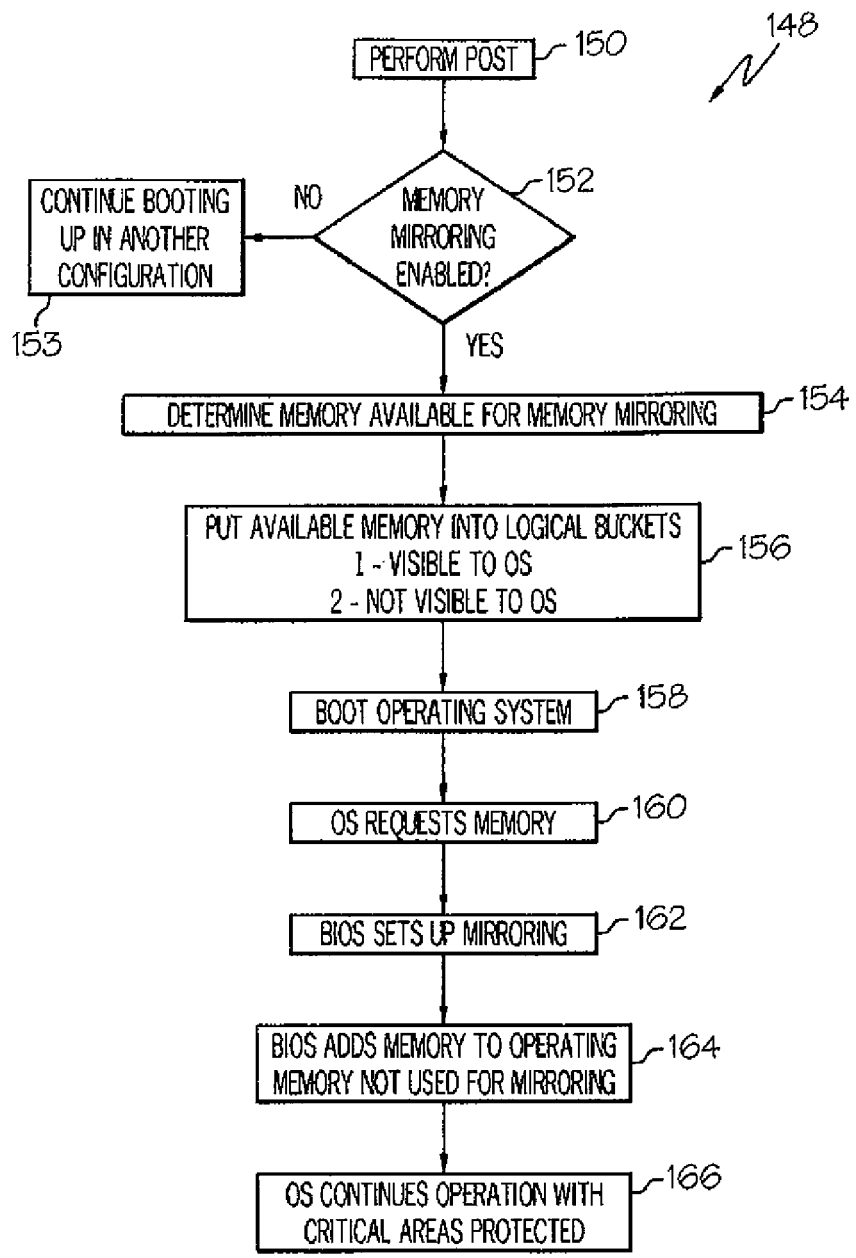

Referring now to FIG. 3B, a flowchart 148 illustrates a routine for selecting memory in a system to be used for memory mirroring. At block 150, a power-on self test (POST) is performed during initialization of system. At block 152, a determination as to if memory mirroring is enabled is made. If memory mirroring is not enabled, the system (e.g., the computing device 100) may continue booting up at block 153 in another memory configuration, such as in independent channel mode, for example. If memory mirroring is enabled, at block 154 a determination is made as to which memory may be used for mirroring. At block 156, available memory may be put into two "logical buckets," one of which may be memory visible to the OS and the other may be not visible to the OS. At block 158, an operating system is booted.

At block 160, the OS may request an amount of mirrored memory from the visible memory. In one embodiment, this request may be made by the OS via an application programming interface. At block 162, the BIOS programs may set up mirroring for the amount of memory requested by the OS. In one embodiment, this may be performed during runtime via a system management interrupt. In another embodiment, this may be performed during runtime.

At block 164, the BIOS programs may add memory to the operating memory, e.g., memory not used for mirroring but available during normal operation. At block 166, the OS may continue operation with critical areas protected through memory mirroring.

It should be appreciated that the routine of the flowchart 142 may be configured such that only a portion of available memory space is made available for mirroring to the OS, the non-available portion being included in non-mirrored memory space. If the OS requests more memory space that that made available, memory space may be removed from the non-mirrored memory space, a "hot remove," and added to the portion of memory space made available for memory mirroring to the OS.

Figure 4:
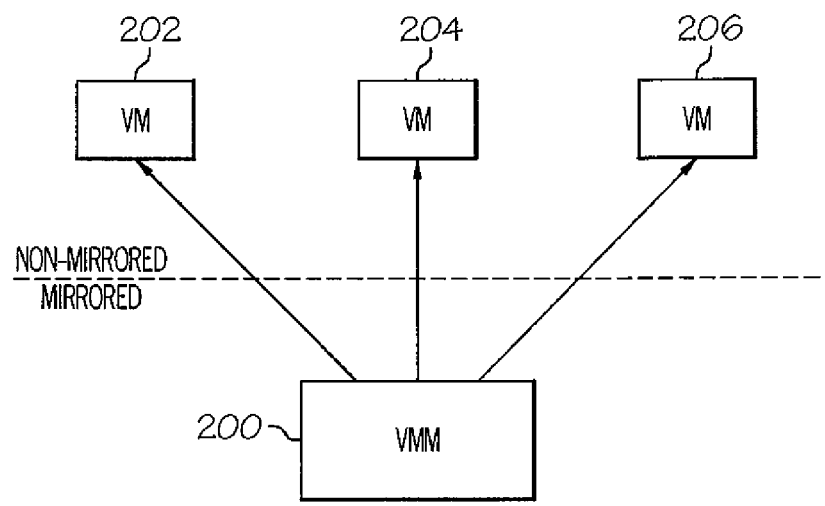
FIG. 4 shows a block diagram of an embodiment of memory mirroring.

Referring now to FIG. 4, there is shown a block diagram of a virtual machine monitor (VMM) 200 set up in mirrored memory. Also shown in FIG. 4 is a plurality of virtual machines (VMs) 202, 204, 206, which may be operated by the VMM 202. During operation of a system, the VMM 200 may be used to select an amount of memory space to be used for memory mirroring. For example, if a server is running a VMM, memory may only need to be mirrored to support critical areas of the VMM itself, which can handle any memory errors with the virtual machines VMs by inspecting memory device/bank registers. Furthermore, VMMs may also determine whether to execute VMs with mirrored or non-mirrored memory space based upon considerations such as purpose and need. In FIG. 4, the VMM 200 is shown as having selected the VMs 202, 204, 206 to be operated without mirroring.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
    determining an amount of memory space in a memory device available for memory mirroring, the memory device comprising at least one volatile memory module;
    receiving a selection from a user of at least a portion of the amount of memory space to be used for memory mirroring, the selection received during an initial boot of a system including the memory device;
    adding a non-selected portion of the available memory to memory space available to an operating system during operation; and
    operating a virtual machine monitor using a mirrored portion of the memory device and operating at least one virtual machine using a non-mirrored portion of the memory device.

2. The method of claim 1, further comprising configuring the memory space in the memory device for mirroring based upon the selection from the user.

3. The method of claim 2, wherein the configuring the memory space comprises configuring the memory space in the memory device during runtime based upon the selection from the user.

4. The method of claim 2, wherein the configuring the memory space comprises configuring the memory space in the memory device during a system management interrupt based upon the selection from the user.

5. The method of claim 1, further comprising performing a read operation for mirrored data stored in a first bank and a second bank of the memory device via a first branch to the first bank that serves as a first channel, based on memory traffic.

6. The method of claim 5, further comprising thereafter performing a read operation for the mirrored data via a second branch to the second bank that serves as a second channel, based on the memory traffic.

7. The method of claim 1, further comprising segregating a second amount of memory space as not visible to the operating system and not mirroring the second amount of memory space.

8. The method of claim 1, further comprising determining the amount of memory space in the memory device available for memory mirroring via a basic input/output system (BIOS).

9. A system comprising:
    a memory device having an amount of memory space available for memory mirroring, the memory device comprising at least one volatile memory module;
    a processor having an operating system to be executed thereon; and
    a user input device to receive a selection from a user, to select the amount of memory space in the memory device to be used for memory mirroring, the selection received during an initial boot of the system;
    wherein the processor is to add non-selected memory space to memory space available to the operating system during operation, and the operating system is configured to request additional memory space available for memory mirroring and responsive thereto the additional memory space is removed from the non-selected memory space and added to the amount of memory space in the memory device to be used for memory mirroring,
    wherein the processor is to operate a virtual machine monitor using a mirrored portion of the memory device and is to operate at least one virtual machine using a non-mirrored portion of the memory device.

10. The system of claim 9, wherein the memory device includes at least one pair of associated memory modules, wherein one of the at least one pair of memory modules has a selectable amount of memory space to be used for memory mirroring, the selectable amount of space corresponding to memory space in the associated memory module.

11. The system of claim 10, wherein the at least one pair of associated memory modules each comprises a dual in-line memory module.

12. The system of claim 9, wherein the processor is to configure the memory space in the memory device for mirroring based upon the selection from the user.

13. The system of claim 9, wherein the processor is to configure the memory space in the memory device for mirroring during runtime based upon the selection from the user.

14. The system of claim 9, wherein the processor is to configure the memory space in the memory device for mirroring during a system management interrupt based upon the selection from the user.

15. The system of claim 9, wherein the processor is to perform a read operation for mirrored data stored in a first bank and a second bank of the memory device via a first branch to the first bank that serves as a first channel, based on memory traffic.

16. The system of claim 15, wherein the processor is to thereafter perform a read operation for the mirrored data via a second branch to the second bank that serves as a second channel, based on the memory traffic.

17. The system of claim 9, wherein the processor is to segregate a second amount of memory space as not visible to the operating system and not mirroring the second amount of memory space.

18. The system of claim 9, wherein the processor is to determine the amount of memory space in the memory device available for memory mirroring via a basic input/output system (BIOS).

19. A non-transitory machine-readable storage medium comprising:
   a plurality of instructions, that in response to being executed, result in a computing device performing the following operations:
   determining an amount of memory space in a memory device available for memory mirroring, the memory device comprising at least one volatile memory module;
   receiving a selection from a user of at least a portion of the amount of memory space to be used for memory mirroring, the selection received during an initial boot of the computing device;
   adding a non-selected portion of the available memory to memory space available to an operating system during operation; and
   operating a virtual machine monitor using a mirrored portion of the memory device and operating at least one virtual machine using a non-mirrored portion of the memory device.

20. The non-transitory machine-readable storage medium of claim 19, wherein the plurality of instructions further result in the computing device configuring the memory space in the memory device for mirroring based upon the selection from the user.

21. The non-transitory machine-readable storage medium of claim 19, wherein the plurality of instructions further result in the computing device configuring the memory space in the memory device for mirroring during runtime based upon the selection from the user.

22. The non-transitory machine-readable storage medium of claim 19, wherein the plurality of instructions further result in the computing device configuring the memory space in the memory device for mirroring during a system management interrupt based upon the selection from the user.

23. The non-transitory machine-readable storage medium of claim 19, wherein the plurality of instructions further results in performing a read operation for mirrored data stored in a first bank and a second bank of the memory device via a first branch to the first bank that serves as a first channel, based on memory traffic.

24. The non-transitory machine-readable storage medium of claim 19, wherein the plurality of instructions further results in thereafter performing a read operation for the mirrored data via a second branch to the second bank that serves as a second channel, based on the memory traffic.

25. The non-transitory machine-readable storage medium of claim 19, wherein the plurality of instructions further results in segregating a second amount of memory space as not visible to the operating system and not mirroring the second amount of memory space.

26. The non-transitory machine-readable storage medium of claim 19, wherein the plurality of instructions further results in determining the amount of memory space in the memory device available for memory mirroring via a basic input/output system (BIOS).

* * * * *